(12) United States Patent  (10) Patent No.: US 7,970,230 B2
Kempf et al.  (45) Date of Patent: *Jun. 28, 2011

(54) IMAGE PROCESSING WITH MINIMIZATION OF RINGING ARTIFACTS AND NOISE

(75) Inventors: Jeffrey Kempf, Allen, TX (US); Arnold P. Skoog, Frisco, TX (US); Roger M. Ikeda, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 944 days.

This patent is subject to a terminal disclaimer.

(21) Appl. No.: 11/832,279

(22) Filed: Aug. 1, 2007

(65) Prior Publication Data

US 2007/0269129 A1 Nov. 22, 2007

Related U.S. Application Data

(62) Division of application No. 10/331,567, filed on Dec. 30, 2002, now Pat. No. 7,254,277.

(51) Int. Cl.
*G06K 9/40* (2006.01)
*H04N 1/407* (2006.01)
*H04B 1/10* (2006.01)

(52) U.S. Cl. .................. 382/260; 358/3.26; 375/254

(58) Field of Classification Search .......... 382/260–270, 382/274–275; 345/615, 660; 358/3.26, 463; 375/240.24, 240.29, 254

See application file for complete search history.

(56) References Cited

U.S. PATENT DOCUMENTS

| 5,384,869 | A | 1/1995 | Wilkinson et al. |
| 5,500,685 | A * | 3/1996 | Kokaram ................ 348/620 |
| 5,926,791 | A | 7/1999 | Ogata et al. |
| 5,940,536 | A | 8/1999 | Wake et al. |
| 6,188,799 | B1 | 2/2001 | Tan et al. |
| 6,574,374 | B1 * | 6/2003 | Acharya ................ 382/257 |
| 6,579,238 | B1 * | 6/2003 | Simopoulos et al. ........ 600/443 |
| 6,847,737 | B1 | 1/2005 | Kouri et al. |
| 6,950,473 | B2 * | 9/2005 | Kim et al. ............. 375/240.29 |
| 7,254,277 | B2 | 8/2007 | Kempf et al. |
| 2002/0057362 | A1 | 5/2002 | Wredenhagen et al. |
| 2002/0158893 | A1 | 10/2002 | Macinnis et al. |
| 2003/0020835 | A1 | 1/2003 | Petrescu |
| 2003/0235248 | A1 | 12/2003 | Kim et al. |
| 2004/0114810 | A1 | 6/2004 | Boliek et al. |
| 2004/0125113 | A1 | 7/2004 | Kempf et al. |
| 2004/0234165 | A1 | 11/2004 | Lee |

FOREIGN PATENT DOCUMENTS

| EP | 0 769 878 A2 | 4/1997 |
| EP | 0 797 349 A2 | 9/1997 |
| GB | 2 262 854 A | 6/1993 |

* cited by examiner

*Primary Examiner* — Kanji Patel
(74) *Attorney, Agent, or Firm* — Charles A. Brill; Wade James Brady, III; Frederick J. Telecky, Jr.

(57) ABSTRACT

A method of reducing ringing artifacts in image data that has been filtered with a high frequency emphasis filter. For each filtered data value, a local variance is calculated from data values at neighboring filter taps. This variance is compared to a threshold, and if the threshold is exceeded, the filtered data value is limited between local minimum and maximum values. A method of reducing noise, also using the local variance, is also described.

10 Claims, 6 Drawing Sheets

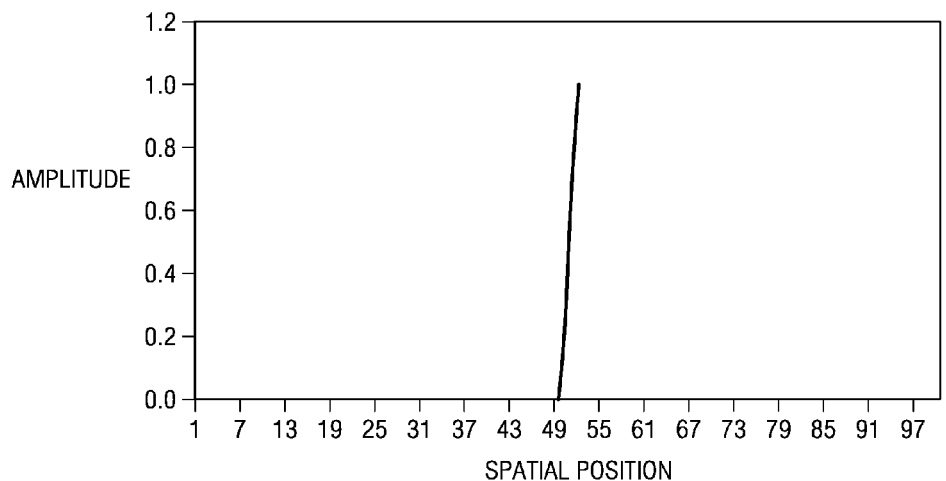
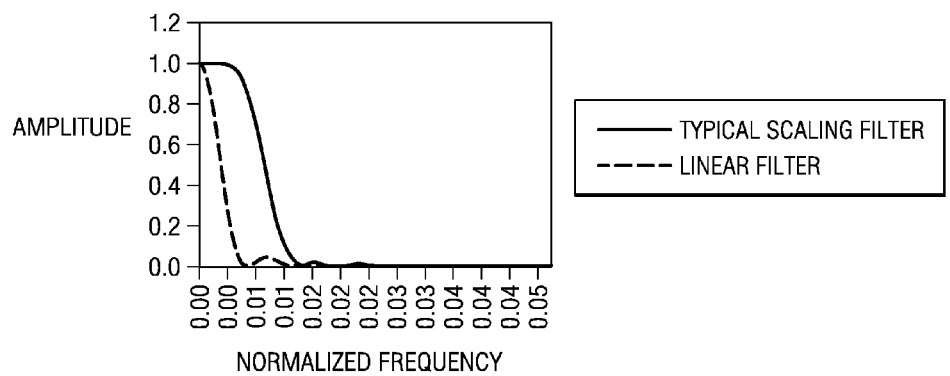
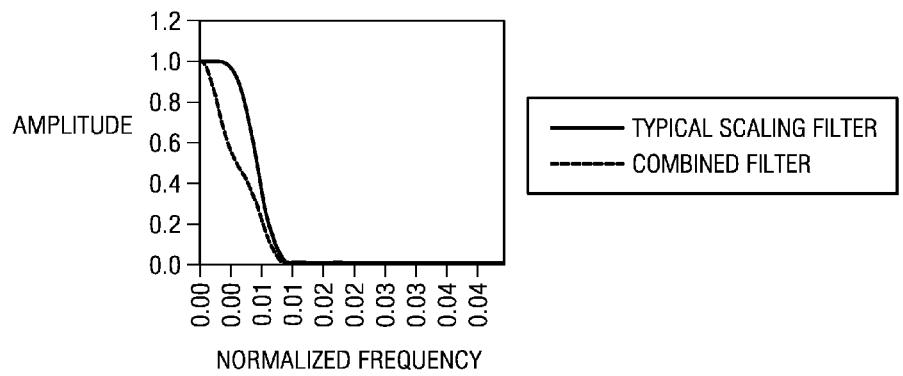

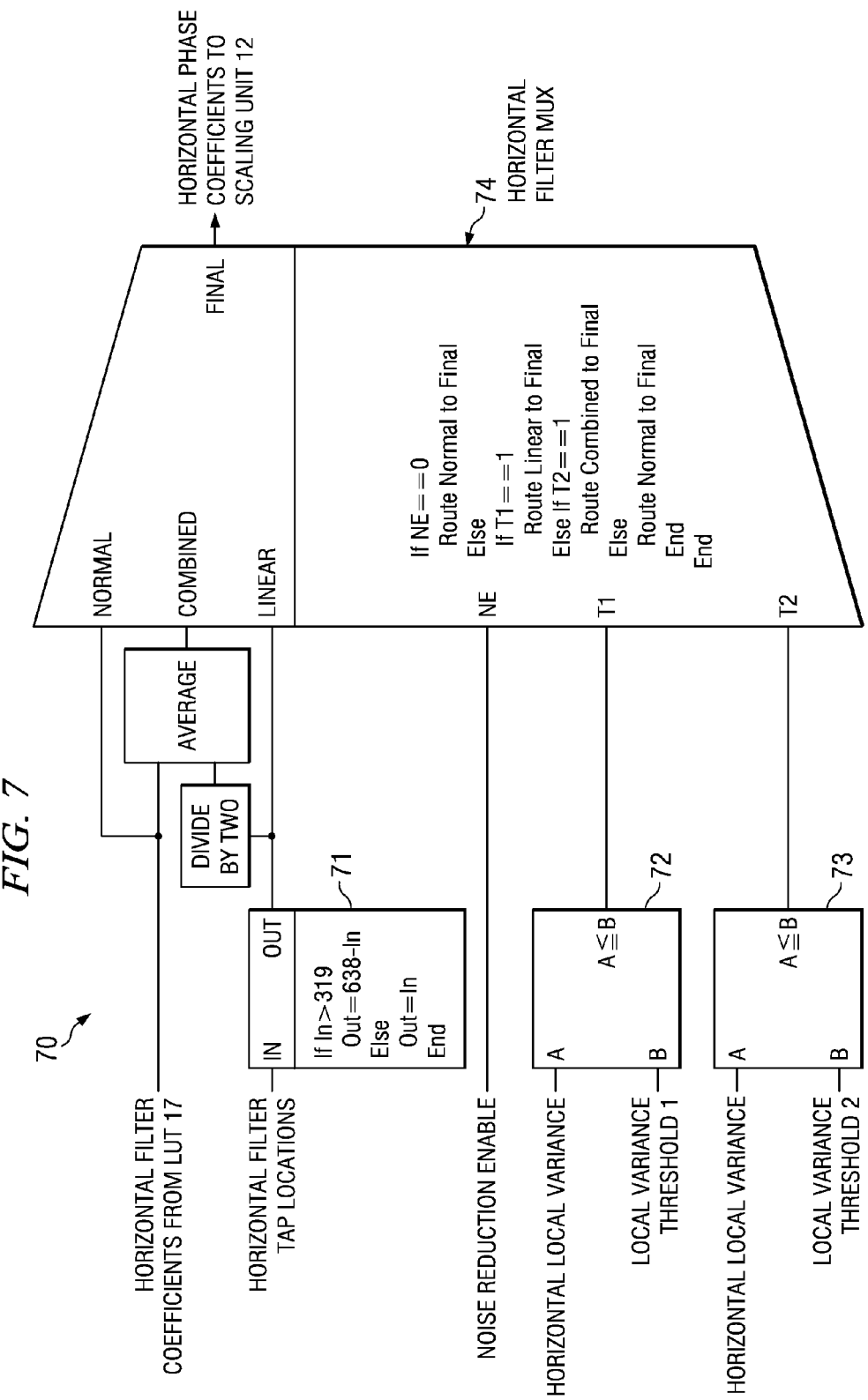

IMAGE PROCESSING WITH MINIMIZATION OF RINGING ARTIFACTS AND NOISE

This application is a Divisional of application Ser. No. 10/331,567, filed 30 Dec. 2002 and now U.S. Pat. No. 7,254,277 B2.

TECHNICAL FIELD OF THE INVENTION

This invention relates to image processing, and more particularly to processing image data for display on a digital display device.

BACKGROUND OF THE INVENTION

Fixed resolution display devices require the display data to have a certain vertical and horizontal resolution, in terms of the number of rows and columns of pixels in each frame. Incoming images, if not already in the correct resolution, must be scaled (resized) to the resolution of the display device.

Scaling the original image means generating a new image that is larger or smaller than the original. The new image will have a larger or smaller number of pixels in the horizontal and/or vertical directions than the original image. A larger image is scaled up (more new pixels); a smaller image is scaled down (fewer newer pixels). A simple case is a 2:1 increase or decrease in size. A 2:1 decrease could be done by throwing away every other pixel (although this simple method results in poor image quality). For a 2:1 increase, new pixels can be generated in between the old by various interpolation methods.

The scaling process is implemented with various scaling algorithms, also called "filters", which treat the rows and columns of the image as discrete time-domain signals. When the original image is analog, the image signal is a sampled version of the original analog image and has an inherent sample rate that results in a fixed number of pixels in the image. To rescale the image, it is resampled at some new, predetermined rate to provide the desired number of pixels. This is done by convolving the rows and columns of the original image with various low-pass filter functions to provide sample values at each of the output image pixel locations. Scaling is performed in two passes. Typically, the rows are rescaled first (horizontal scaling), then the new rows are used for resealing the columns (vertical scaling).

A feature of some vertical and horizontal scaling filters is a high frequency emphasis. These scaling filters have stronger gain, greater than unity, in the high-frequency region of their passband than in the low-frequency region of their passband. Although this emphasis can be useful for sharpening the image, it can result in artifacts. High frequency emphasis filtering can also be used for image data that does not require scaling, to achieve image sharpness.

SUMMARY OF THE INVENTION

One aspect of the invention is a method of reducing ringing artifacts in image data after it has been filtering with a high frequency emphasis filter. It is assumed that the filter has a number of filter taps, such as a multi-tap polyphase filter.

For each filtered data value, a local variance is calculated as the difference between the unfiltered maximum and minimum values at neighboring filter taps. This local variance is compared to a large-transition threshold. If the local variance is greater than the large-transition threshold, the filtered data value is limited to a value between unfiltered maximum and minimum values at neighboring taps. If the local variance is less than the large transition threshold, the filtered data value is not limited. This process is repeated for each data value, using new neighboring tap values.

An advantage of the ringing minimization method is that it permits the use of high frequency emphasis filtering without introducing ringing artifacts. The high frequency filtering can be performed for sharpness in connection with image scaling, or on data that is already in the correct resolution.

BRIEF DESCRIPTION OF THE DRAWINGS

FIG. 6 illustrates the filtered output of FIG. 3, but with ringing minimization applied.

FIG. 7 illustrates a noise reduction unit for modifying the filter coefficients of the horizontal scaling unit of FIG. 1.

FIG. 8 illustrates the frequency response of a linear filter and a typical resizing filter.

FIG. 9 illustrates the frequency response of a semi-linear filter and a typical resizing filter.

DETAILED DESCRIPTION OF THE INVENTION

Figure 1:
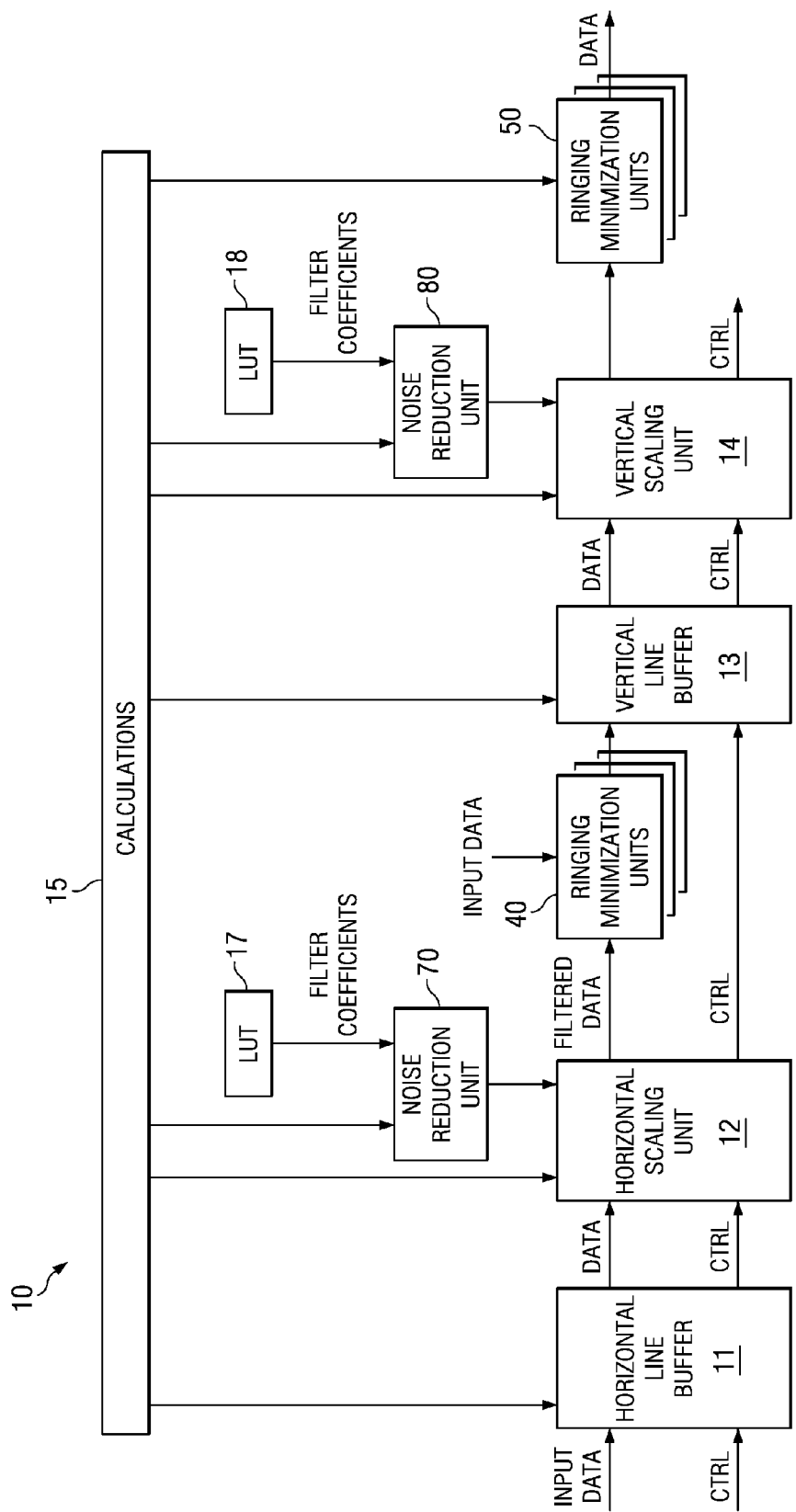
FIG. 1 is a block diagram of an image processing system having ringing minimization units and noise reduction units.

FIG. 1 is a block diagram of an image processing system 10, having both a horizontal scaling unit 12 and a vertical scaling unit 14. Horizontal scaling unit 12 performs horizontal position counter maintenance and implements a horizontal scaling filter. Vertical scaling unit 14 performs vertical position counter maintenance and implements a vertical scaling filter. Scaling units 12 and 14 may be implemented with various commercially available processing systems. A calculation unit 15 computes and stores various values used during image processing.

For purposes of example, horizontal scaling unit 12 is a polyphase filter with five taps per phase. Vertical scaling unit 14 is a polyphase filter with three taps per phase. However, the invention is useful with any polyphase scaling filter, regardless of the number of taps. Look-up tables (LUTs) 17 and 18 store the filter coefficients, and may be implemented with RAM devices. In the example of this description, LUT 17 stores 639 coefficients and LUT 18 stores 383 coefficients. Both LUTs 17 and 18 are sized accordingly.

A horizontal line buffer 11 stores input values for the horizontal scaling unit 12, and a vertical line buffer 13 stores data lines for the vertical scaling unit 14. Horizontal line buffer 11 has three FIFO units, one for each color (red, green, blue). Vertical line buffer 13 has nine line memories, three per color, corresponding to the three tap filter. Because the horizontal filter is before the vertical filter, the size of the line memories is at least as large as the maximum horizontal output resolution. A feature of system 10 is that data buffering for the filters is accomplished without frame buffers. In other words, there is no need to store a whole image frame at once. However, the ringing minimization and noise reduction methods and systems described herein are also useful with image processing systems that do use frame buffers.

FIGS. 2-6 and the accompanying description below describe one feature of image processing system 10—the elimination of ringing artifacts when horizontal scaling unit 12 or vertical scaling unit 14, or both, are implemented as high frequency emphasis filters. The high frequency emphasis is the result of the particular filter coefficients stored in LUTs 17 and 18. As explained in the Background, the high frequency emphasis provides image sharpening. Ringing minimization units 40 and 50 implement the ringing minimization feature of the invention.

FIGS. 7-10 describe a second feature of image processing system 10—the modification of the filter coefficients stored in LUTs 17 and 18 so as to reduce noise. Noise reduction units 70 and 80 implement this feature of the invention.

In the example of this description, ringing minimization units 40 and 50 and noise reduction units 70 and 80 are used in connection with scaling units 12 and 14. However, it should be understood that these features are also useful in an image processing system that does not perform scaling. For example, an image that does not require scaling could be sharpened using a high frequency emphasis filter, therefore giving rise to a need for ringing minimization.

Figure 2:
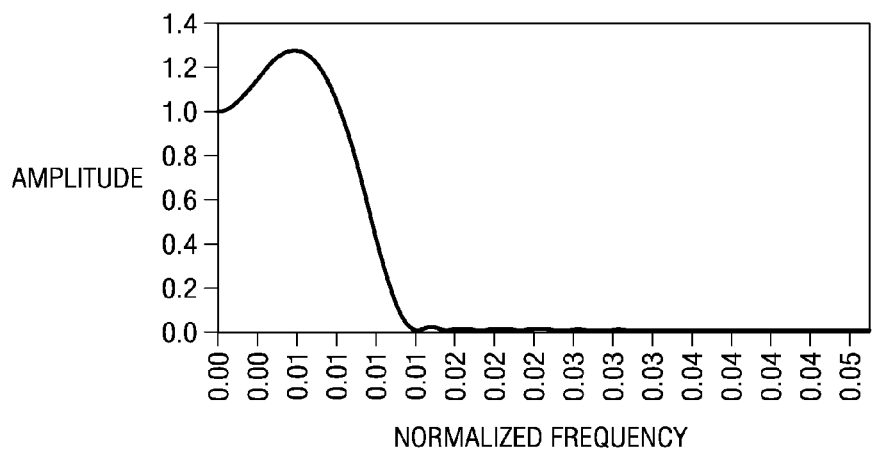
FIG. 2 illustrates the frequency response of a high frequency emphasis filter.

FIG. 2 illustrates an example of the frequency response of a typical high frequency emphasis filter, such as filter 12 or 14 when so implemented. As illustrated, such filters have stronger gain in the high frequency region of their pass band than in the low frequency region of their pass band.

Figure 3:
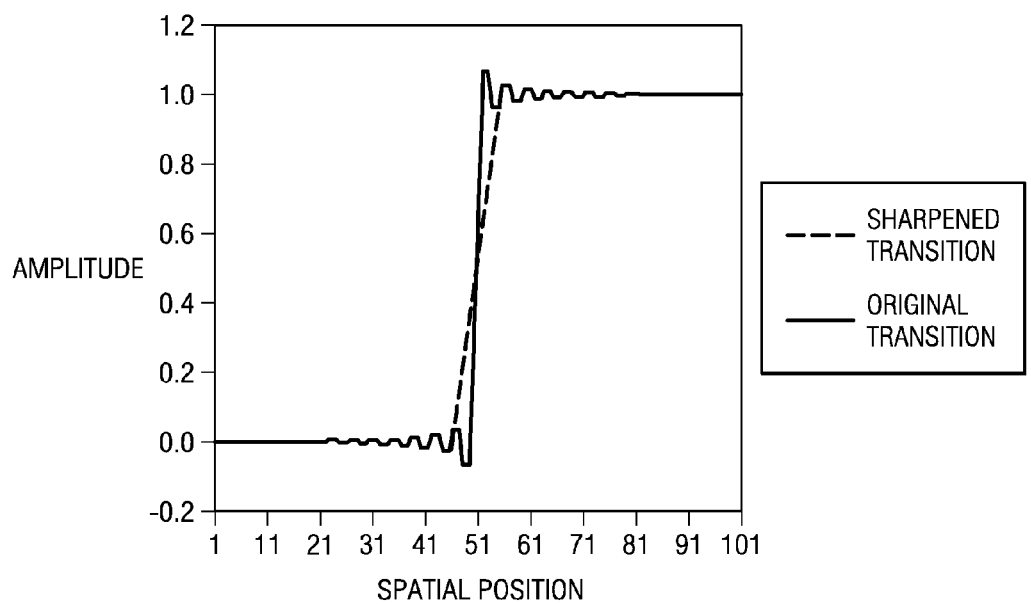
FIG. 3 illustrates the spatial result of a high frequency emphasis filter, compared to the result of a non high frequency emphasis filter.

FIG. 3 illustrates the spatial result of a high frequency emphasis filter, compared to a non high frequency emphasis filter. As illustrated, the high frequency emphasis filter does provide a sharpening effect. However, it also produces a ringing artifact, caused by the filter's underdamped response. In other words, the filter produces oscillations near high frequency edges.

Referring again to FIG. 1, ringing minimization units 40 and 50 process the output from the horizontal scaling unit 12 and vertical scaling unit 14, respectively. As explained below, these units 40 and 50 calculate a local variance of the unfiltered input signal, and limit the filtered data they receive from the respective scaling units 12 and 14. They are "adaptive" in the sense that they adaptively determine when to limit the filtered data to local minimum and maximum values.

Figure 4:
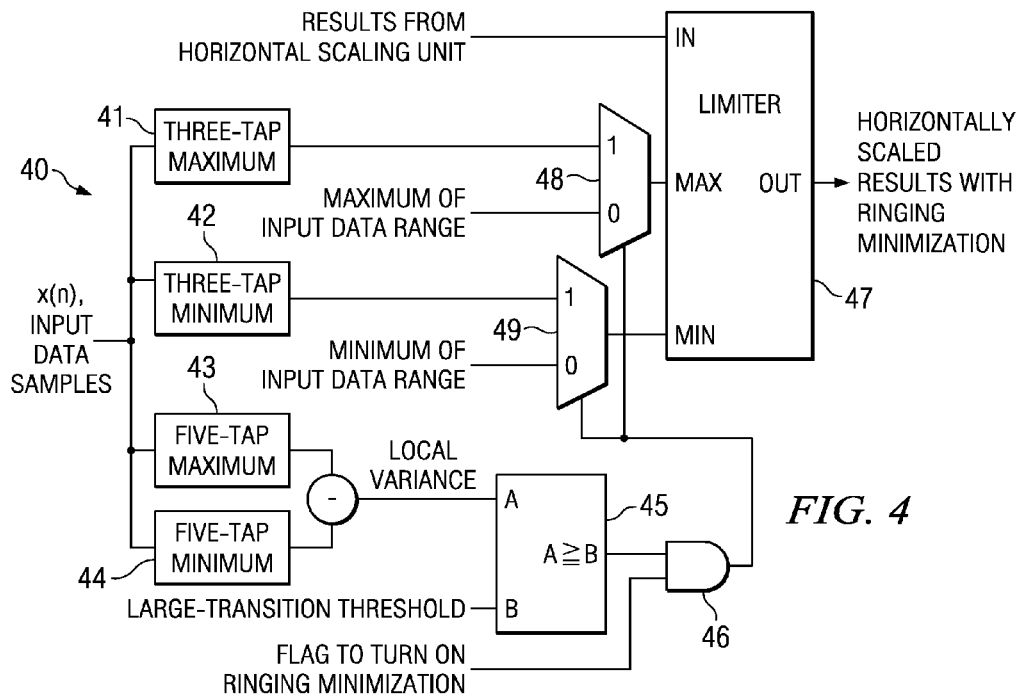
FIG. 4 illustrates a ringing minimization unit for the horizontal scaling filter of FIG. 1.

FIG. 4 illustrates ringing minimization unit 40, which receives the output of horizontal scaling unit 12. Unit 40 is implemented with logic circuitry, thus FIG. 4 further illustrates the process of minimizing the ringing artifact that would otherwise exist in the output of horizontal scaling unit 12. Ringing minimization unit 40 is duplicated for each color, thus there are three ringing minimization units 40 at the output of horizontal scaling unit 12.

Limiter 47 receives the filtered output of the horizontal scaling filter within horizontal scaling unit 12, which has a high frequency emphasis. It also receives local maximum and minimum values of the unscaled data, as determined by maximum and minimum finders 41 and 42.

More specifically, unscaled input data samples, x(n), are delivered to four maximum/minimum finding circuits, which may be implemented with conventional logic circuitry. Two of these circuits are a five-tap maximum finder 43 and a five-tap minimum finder 44, which find the maximum and minimum values of the input data within the five tap window of horizontal scaling unit 12. Expressed mathematically:

maximum=max $(x(n-2), x(n-1), x, x(n+1), x(n+2))$ minimum=min $(x(n-2), x(n-1), x, x(n+1), x(n+2))$ The difference between these two values is calculated, and used as a local variance value. Maximum finder 41 and minimum finder 42 are used to determine the minimum and maximum of the three input data values closest to the center tap.

A comparator 45 receives the local variance value and a programmable large transition threshold. The result of the comparison is delivered to a limiter 47. An optional AND gate 46 may be used to AND the output of the comparator 45 with a flag, to turn the ringing circuit on or off.

If the local variance is greater than or equal to the large transition threshold, then a high frequency edge is present. In this case, limiter 47 limits the output of horizontal scaling unit 12 between the maximum and minimum of the three input values closest to the center tap, that is, to the local maximum and minimum input values. By limiting the output of the high frequency emphasis filter to the local input data values within the filter, over-shoot and under-shoot are eliminated from the high and low sides of a large transition edge.

If the local variance is less than the large transition threshold, then a low frequency edge is present, and the high frequency emphasis filter will not produce ringing artifacts. For this case, limiter 47 does not limit the filter output data to input values.

Multiplexers 48 and 49 are used together with AND gate 46 to turn the ringing minimization on and off. Multiplexer 48 receives the local maximum and the maximum of the input data range (typically 255). Multiplexer 49 receives the local minimum and the minimum of the input data range (typically 0). If ringing minimization is "on", as determined by AND gate 45, multiplexers 48 and 49 deliver the local maximum and minimum values to limiter 47. If ringing minimization is "off", as determined by AND gate 46, multiplexers 48 and 49 deliver the maximum and minimum over the input data range.

Figure 5:
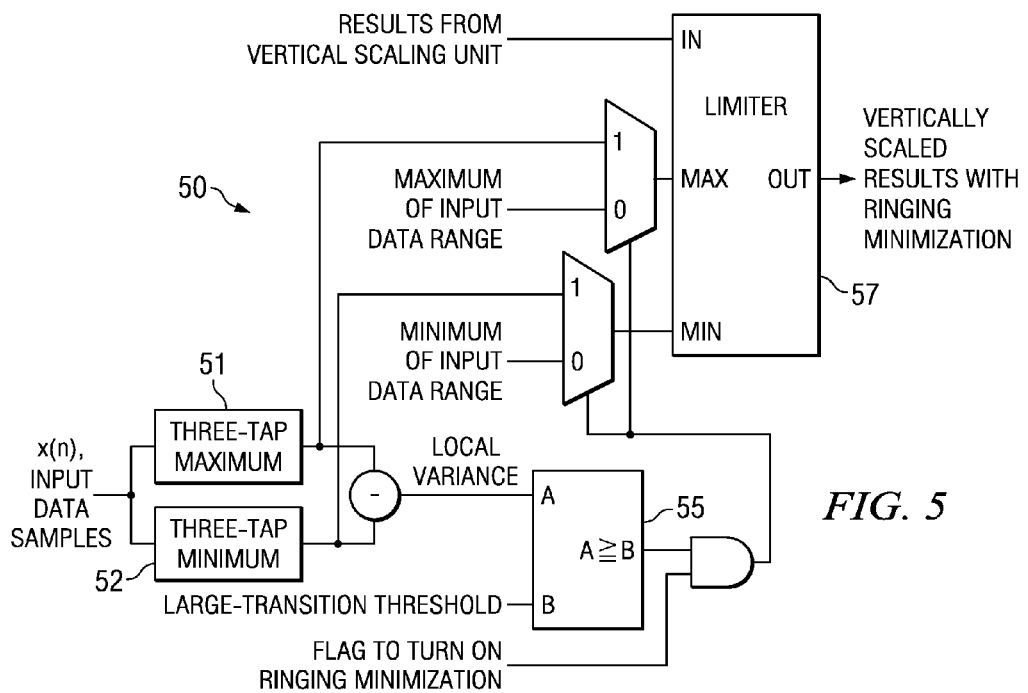
FIG. 5 illustrates a ringing minimization unit for the vertical scaling filter of FIG. 1.

FIG. 5 illustrates ringing minimization unit 50, which receives the output of vertical scaling unit 14. Unit 50 is implemented with logic circuitry 50, thus FIG. 5 further illustrates the process of minimizing the ringing artifact that would otherwise exist in the output of vertical scaling unit 14.

Limiter 57 operates in much the same manner as limiter 47 of unit 40. It receives the filtered output of the vertical scaling filter within vertical scaling unit 12, which as stated above, has a high frequency emphasis. It also receives local maximum and minimum values of the unscaled data, as determined by maximum and minimum finders 51 and 52.

Unscaled input data samples, x(n), are delivered to two maximum/minimum finders 51 and 52, which may be implemented with conventional logic circuitry. Maximum and minimum finders 51 and 52 are used to determine the maximum and minimum values of the input data within the three tap window of vertical scaling unit 14. Expressed mathematically:

maximum=max $(x(n-1), x, x(n+1))$ minimum=min $(x(n-1), x, x(n+1))$

The difference between these two values is used as a local variance. A comparator 55 receives this difference, as well as a programmable large transition threshold. The results of the comparison are delivered to limiter 57. If the local variance is greater than or equal to the large transition threshold, limiter 57 limits the output of filter 14 between the minimum and maximum values within the filter. Otherwise, the results of the filter 14 are allowed to pass through ringing minimization unit 50 unaltered.

In various embodiments of the ringing minimization units 40 and 50, the "neighboring filter taps" used for determining the local variance, as well as for determining the limiting values of the limiter, can vary. These taps can be the same number of taps as the filter, or can be a subset. For example, the unit 40 could be like unit 50, having a single set of maximum/minimum finder circuits. Furthermore, any of the maximum/minimum finder circuits of either unit could use a different number of neighboring filter taps. By "neighboring filter taps" is meant all or some of the filter taps within the n-tap filter window that produced a particular data value.

FIG. 6 illustrates the filtered output of FIG. 3, but with the above-described ringing minimization applied to the output. As illustrated, the ringing artifact has been eliminated, but the sharp edge transition is maintained.

In addition to being used for ringing artifact elimination, the local variance values described above may also be used to perform spatial noise reduction. In general, this method involves determining whether a local variance within an image is low or high and whether the variance represents an edge or noise. If it represents noise, the high frequency portion of the filter is adjusted down. Like the ringing minimization method described above, the noise reduction method is adaptive and affects the filter output according to values of neighboring filter taps.

FIG. 7 illustrates a noise reduction unit 70 to be used in associated with horizontal scaling unit 12. It is designed for LUT 17, which has 639 coefficients and does not require additional memory. The horizontal filter tap locations are delivered to a logic circuit 71, which determines whether the input is greater than the value 319. If so, that value is subtracted from 638. In effect, logic unit 71 provides linear filter coefficients that are symmetrical around the center tap, in this case 0 to 319 and then to 0. As explained below, the resulting values are used to alter the coefficients stored in LUT 17.

Multiplexer 74 selects between three classes of filter coefficients: normal (as stored in LUT 17), linear, and a "semi-linear" combination of normal and linear filter coefficients. Two variance levels are used to define three frequency bins, which determine which filter is to be delivered to the horizontal scaling unit 12.

More specifically, a local variance value is delivered to each of two comparators 72 and 73. When system 10 is implemented with both ringing minimization system 40 and noise reduction system 70, this local variance may be the same value as described above in connection with FIG. 4. If system 10 is implemented with noise reduction and not ringing minimization, additional circuitry, similar to that described in connection with FIG. 4 may be added to noise reduction unit 70 to compute the local variance.

Comparators 72 and 73 compare the local variance value to the first and second thresholds, respectively. When the local variance is less than the first threshold, the center tap is assumed to be lying within a flat field or low frequency region. Instead of using the coefficients in the LUT 17, multiplexer 74 selects coefficients for a linear filter. The coefficients of the linear filter are derived from the filter tap locations, as determined by circuit 71. The linear filter is a severe low pass filter, and will remove high frequency low level noise. In effect, the filter coefficients stored in LUT 17 are modified so as to re-configure the scaling filter within horizontal scaling unit 12 as a semi-linear filter.

FIG. 8 illustrates the frequency response of a typical horizontal scaling filter, as compared to the horizontal linear filter whose coefficients are derived in noise reduction unit 70. The pass band of the linear filter is about one-third the size of the pass band of the typical scaling filter.

Referring again to FIG. 7, if the local variance is between the first and second variance thresholds, then the center tap is assumed to be in a mid-frequency region. A less severe low pass filter is used in these regions. It is derived from a combination between the linear filter described above and the scaling filter adjusted for sharpness. The amplitude of the horizontal linear filter is halved and subsequently averaged with the coefficients of the horizontal scaling filter. Each phase is normalized after the filtering operation occurs. In effect, the filter coefficients stored in LUT 17 are modified so as to re-configure the scaling filter within horizontal scaling unit 12 as a "semi-linear" filter.

FIG. 9 illustrates the frequency response of a typical horizontal scaling filter, as compared to the combined filter described in the preceding paragraph. This filter is "semi-linear" in the sense that the output is between that of the linear filter of FIG. 8 and that of a typical scaling filter.

Referring again to FIG. 7, if the variance is above both variance thresholds, then the center tap is assumed to be located across a high frequency edge. To maintain crisp edges, no noise reduction is performed in these regions. Multiplexer 70 delivers the filter coefficients stored in LUT 18, which in the example of this description, represent a scaling filter.

Figure 10:
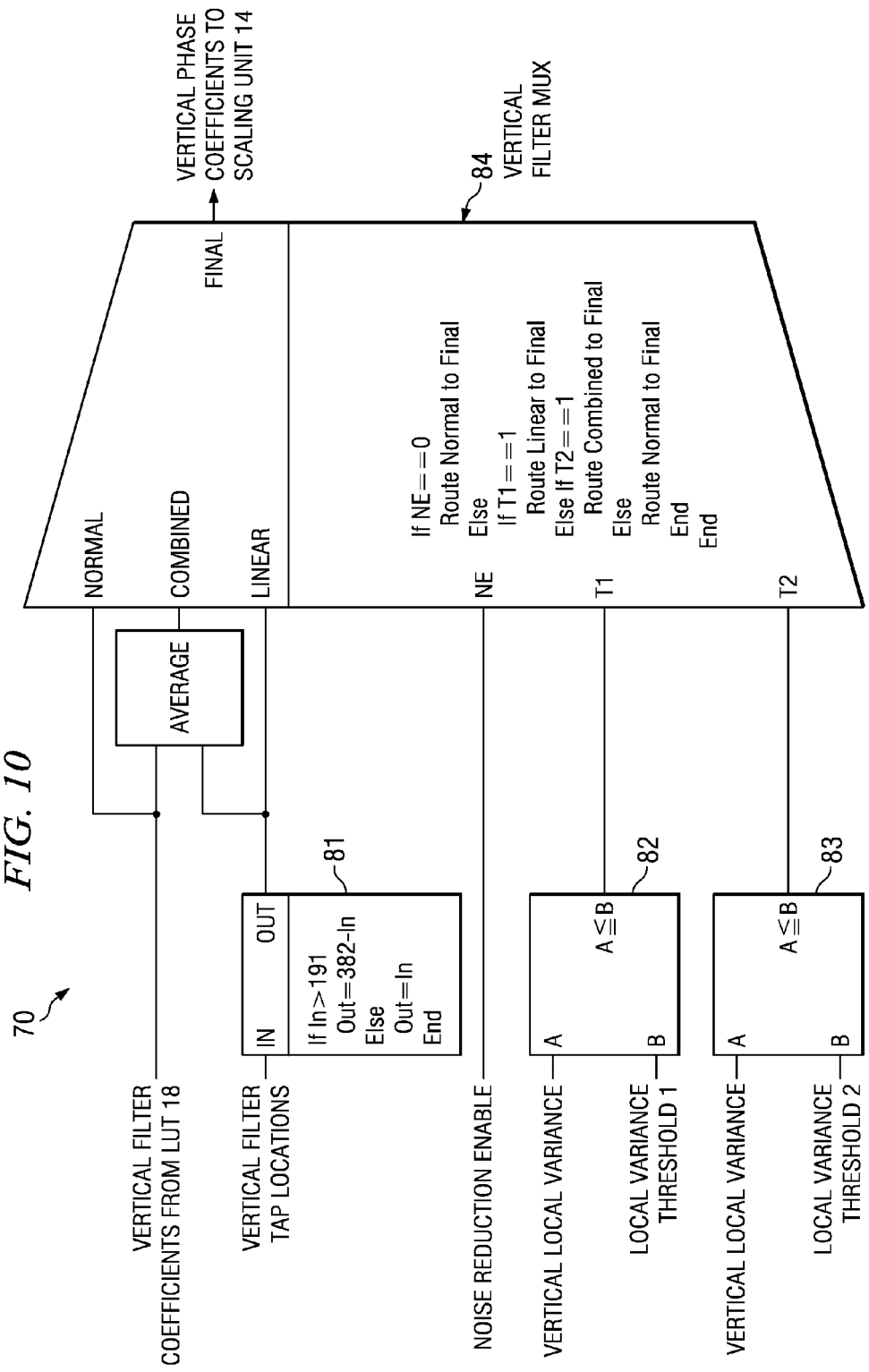
FIG. 10 illustrates a noise reduction unit for modifying the filter coefficients of the vertical scaling unit of FIG. 1.

FIG. 10 illustrates how the noise reduction circuit of FIG. 7 is modified for use with the vertical scaling engine 14. The operation of circuit 100 is the same as described above for circuit 70, except in the case where the variance is between the first and second variance thresholds. The average of the vertical linear filter and the vertical scaling filter is used. Otherwise, multiplexer 84, and logic circuits 81, 82, and 83 operate in much the same manner as the comparable circuits described above in connection with FIG. 7.

In the above-described embodiments, the following equations may be used to describe the horizontal and vertical semi-linear filters:

Horizontal=(Linear/2+LUT Coefficients)/2

Vertical=(Linear+LUT Coefficients)/2

However, expressed more generally, a weighted sum is used to derive the semi-linear filters, expressed as follows:

Horizontal=$x$(Linear)+(1−$x$)(LUT Coefficients), where 0<=$x$<=1

Vertical=$y$(Linear)+(1−$y$)(LUT Coefficients), where 0<=$y$<=1

As indicated above, the noise reduction circuits 70 and 100 provide adaptive noise reduction with no increased memory requirement. The registers and line memories used to perform scaling are incorporated into the noise reduction circuitry. Moreover, the filter coefficients for noise reduction do not need to be stored in memory. They are derived from a simple function that relates filter coefficients to filter tap location. Furthermore, noise reduction can be performed even when the input resolution is the same as the output resolution. Noise reduction can also be performed with a high frequency emphasis filter. The resulting image has a lower noise floor and sharper edges.

As indicated above, both the ringing minimization units 40 and 50 and noise reduction units 70 and 80 use the same local variance values. Thus, if system 10 includes both ringing minimization and noise reduction, the same logic circuitry for determining the local variance may be used for both methods. However, as stated above, system 10 may implement either ringing minimization or noise reduction and not necessarily both.

Other Embodiments

Although the present invention has been described in detail, it should be understood that various changes, substitutions, and alterations can be made hereto without departing from the spirit and scope of the invention as defined by the appended claims.

What is claimed is:

1. A method of reducing ringing artifacts in image data after it has been filtered by a filter having a number of filter taps, comprising the steps of:
   determining a local variance for each filtered data value, the local variance being the difference between the unfiltered maximum and minimum values at neighboring filter taps of that data value;
   comparing the local variance to a large-transition threshold;
   if the local variance is greater than the large-transition threshold, limiting the filtered data value to a value between maximum and minimum values at neighboring taps of that data value; and
   if the local variance is less than the large transition threshold, not limiting the filtered data value.

2. The method of claim 1, wherein determining step uses all taps of the filter as the neighboring filter taps.

3. The method of claim 1, wherein the limiting step uses fewer than all taps of the filter as the neighboring filter taps.

4. The method of claim 1, wherein the determining step and the limiting step use the same number of neighboring filter taps.

5. The method of claim 1, wherein the determining step uses a larger number of neighboring filter taps than does the limiting step.

6. A method of reducing noise in image data that is to be processed by a filter having a number of filter taps and a number of filter coefficients, comprising the steps of:
   determining a local variance for each image data value, the local variance being the difference between the maximum and minimum values at neighboring filter taps of that data value;
   comparing the local variance to a first variance threshold;
   comparing the local variance to a second variance threshold;
   if the local variance is less than the first threshold, modifying the filter coefficients so as to re-configure the filter as a linear filter;
   if the local variance is between the first and the second threshold, modifying the filter coefficients so as to re-configure the filter as a semi-linear filter; and
   if the local variance is greater than both thresholds, not modifying the filter coefficients.

7. The method of claim 6, wherein the linear filter is derived from the filter tap location values.

8. The method of claim 6, wherein the semi-linear filter is derived by calculating a weighted sum of the filter coefficients and coefficients corresponding to a linear filter.

9. The method of claim 6, wherein the local variance is derived from all neighboring filter taps.

10. The method of claim 6, wherein the local variance is derived from a subset of all neighboring filter taps.

* * * * *